(12) United States Patent
MacMurrough

(10) Patent No.: US 11,229,962 B1
(45) Date of Patent: Jan. 25, 2022

(54) SYSTEM, METHOD AND APPARATUS FOR FIN CUTTER FOR DOWNHOLE TOOL

(71) Applicants: Black Diamond Oilfield Rentals, LLC, The Woodlands, TX (US); Erdos Miller, Inc., Houston, TX (US)

(72) Inventor: John MacMurrough, Lafayette, LA (US)

(73) Assignees: Black Diamond Oilfield Rentals, LLC, The Woodlands, TX (US); Erdos Miller, Inc., Houston, TX (US)

( * ) Notice: Subject to any disclaimer, the term of this patent is extended or adjusted under 35 U.S.C. 154(b) by 0 days.

(21) Appl. No.: 17/225,276

(22) Filed: Apr. 8, 2021

(51) Int. Cl.
 *B23D 51/04* (2006.01)
 *E21B 17/10* (2006.01)
 *B25B 11/00* (2006.01)

(52) U.S. Cl.
 CPC .............. *B23D 51/04* (2013.01); *B25B 11/00* (2013.01); *E21B 17/1014* (2013.01)

(58) Field of Classification Search
 CPC ..... B23D 51/04; B25B 11/00; E21B 17/1014; Y10T 408/03; Y10T 409/30868; Y10T 409/305824
 USPC ................... 408/1 R; 269/57, 63, 73; 606/87
 See application file for complete search history.

(56) References Cited

U.S. PATENT DOCUMENTS

| | | | |
|---|---|---|---|
| 3,976,347 A | 8/1976 | Cooke et al. | |
| 4,721,104 A * | 1/1988 | Kaufman | A61B 17/1764 606/88 |
| 4,872,509 A | 10/1989 | Dickinson et al. | |
| 5,131,464 A | 7/1992 | Lenhart et al. | |
| 5,141,051 A | 8/1992 | Lenhart | |
| 5,159,978 A | 11/1992 | Tomek et al. | |
| 5,334,801 A | 8/1994 | Mohn | |
| 5,364,401 A * | 11/1994 | Ferrante | A61B 17/155 606/102 |
| 5,820,416 A | 10/1998 | Carmichael | |

(Continued)

FOREIGN PATENT DOCUMENTS

| | | |
|---|---|---|
| WO | 2002086287 A2 | 10/2002 |
| WO | 2020243103 A1 | 12/2020 |
| WO | 2020243151 A1 | 12/2020 |

OTHER PUBLICATIONS

The International Searching Authority, Notification of Transmittal of the International Search Report and the Written Opinion of the International Searching Authority dated Aug. 25, 2020 for International Application No. PCT/US2020/034665, nine pages.

(Continued)

*Primary Examiner* — Mahdi H Nejad
(74) *Attorney, Agent, or Firm* — Dickinson Wright, PLLC; Michael E. Noe, Jr.; Jonathan H. Harder

(57) ABSTRACT

A system for trimming fins on a downhole tool is disclosed. The system includes a jig that mounts to the shaft of the tool. A linear aperture is formed in the jig and has a closed end, an open end, and is sized to axially receive a single fin of the tool. A channel is located on an underside of the jig beneath the aperture. The channel has an inner radius of curvature. The inner radius of curvature is substantially similar to an outer radius of curvature of the shaft. The channel can form a friction lock on the exterior of the shaft and be removably attached to the shaft without fasteners. The channel is arcuate and has a selected arcuate span.

17 Claims, 9 Drawing Sheets

(56) References Cited

U.S. PATENT DOCUMENTS

| | | |
|---|---|---|
| 6,519,568 B1 | 2/2003 | Harvey et al. |
| 6,614,718 B2 | 9/2003 | Cecconi et al. |
| 6,791,470 B1 | 9/2004 | Drumheller |
| 6,915,849 B2 | 7/2005 | Nuth |
| 6,985,750 B1 | 1/2006 | Vicknair et al. |
| 7,074,064 B2 | 7/2006 | Wallace |
| 7,506,699 B1 | 3/2009 | Harvey et al. |
| 7,798,216 B2 | 9/2010 | Phillips et al. |
| 8,397,815 B2 | 3/2013 | MacDougall et al. |
| 8,636,549 B2 | 1/2014 | Pratt et al. |
| 9,130,743 B2 | 9/2015 | Levin et al. |
| 9,683,438 B2 | 6/2017 | Fanini et al. |
| 9,960,559 B2 | 5/2018 | Pratt et al. |
| 10,097,517 B2 | 10/2018 | McElwee et al. |
| 10,145,211 B2 | 12/2018 | Santoso et al. |
| 10,669,841 B1 | 6/2020 | Erdos et al. |
| 10,711,530 B1 | 7/2020 | Miller et al. |
| 2002/0060952 A1 | 5/2002 | Cecconi et al. |
| 2002/0113718 A1 | 8/2002 | Wei et al. |
| 2002/0170711 A1 | 11/2002 | Nuth |
| 2003/0151977 A1 | 8/2003 | Shah et al. |
| 2004/0108114 A1 | 6/2004 | Lerche et al. |
| 2004/0234269 A1 | 11/2004 | Laamanen et al. |
| 2005/0026565 A1 | 2/2005 | Goldstein et al. |
| 2005/0051327 A1 | 3/2005 | Vinegar et al. |
| 2007/0007001 A1 | 1/2007 | Hiron et al. |
| 2008/0136665 A1 | 6/2008 | Aiello et al. |
| 2009/0115625 A1 | 5/2009 | Young |
| 2009/0289808 A1 | 11/2009 | Prammer |
| 2010/0201540 A1 | 8/2010 | Li et al. |
| 2010/0245121 A1 | 9/2010 | Reed et al. |
| 2012/0048552 A1 | 3/2012 | MacDougall et al. |
| 2013/0066560 A1 | 3/2013 | Dyatlov et al. |
| 2013/0093597 A1 | 4/2013 | Stolpman |
| 2013/0147633 A1 | 6/2013 | Sumrall et al. |
| 2013/0168084 A1 | 7/2013 | Conn |
| 2013/0176139 A1 | 7/2013 | Chau et al. |
| 2013/0320664 A1 | 12/2013 | Wium |
| 2015/0240627 A1 | 8/2015 | Gao et al. |
| 2015/0255930 A1 | 9/2015 | Lee |
| 2016/0003035 A1 | 1/2016 | Logan et al. |
| 2016/0084076 A1 | 3/2016 | Fanini et al. |
| 2016/0291193 A1 | 10/2016 | Williams |
| 2016/0326867 A1 | 11/2016 | Prammer |
| 2016/0362976 A1 | 12/2016 | Petrovic et al. |
| 2017/0111112 A1 | 4/2017 | San Martin et al. |
| 2018/0156031 A1 | 6/2018 | Tran et al. |
| 2019/0145243 A1 | 5/2019 | Tubel et al. |
| 2019/0353031 A1 | 11/2019 | Logan et al. |

OTHER PUBLICATIONS

The International Searching Authority, Notification of Transmittal of the International Search Report and the Written Opinion of the International Searching Authority dated Jun. 25, 2020 for International Application No. PCT/US2020/034572, six pages.

The International Searching Authority, "Notification of Transmittal of the International Search Report and the Written Opinion of the International Searching Authority" dated Feb. 8, 2021 for International Application No. PCT/US2020/059301, 12 pages.

\* cited by examiner

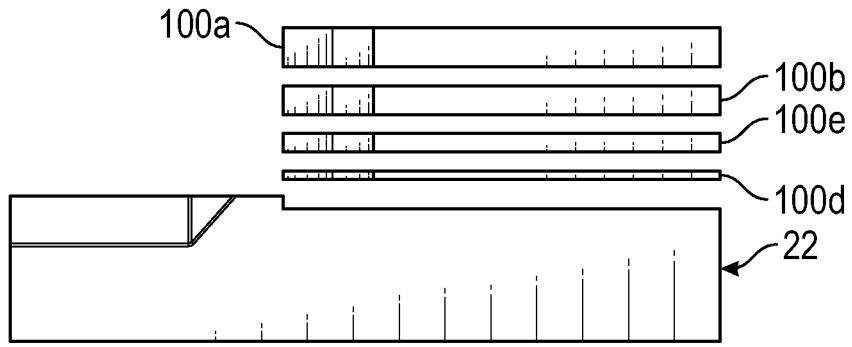

FIG. 8

(A) Removably mounting a jig to an outer surface of the shaft of the downhole tool such that the jig straddles a first fin (B) Adjusting a cutting height of the jig relative to a top of the first fin to a selected height (C) Cutting the first fin to the selected height (D) Removing the jig from the shaft (E) Rotating the shaft to locate a second fin in a desired position (F) Repeating steps (A) through (E) for the second fin and each remaining fin

FIG. 9

SYSTEM, METHOD AND APPARATUS FOR FIN CUTTER FOR DOWNHOLE TOOL

CROSS-REFERENCE TO RELATED APPLICATIONS

None.

BACKGROUND

In oilfield exploration and production operations, and in other drilling applications, downhole tools are often disposed "downhole" in a bore defined by a string of tubular members. The string of tubular members are known in the industry as a drill string and are generally used to advance and/or rotate a drill bit to form a borehole. Downhole tools are used for various applications, such as fishing of left over equipment/tools in the borehole or bore, repairing and performing cementing (i.e., sealing a borehole), casing operations, downhole measurements, etc.

In some applications, the downhole tool includes fins that stabilize and centralize the downhole tool in the bore. To ensure proper stabilization of the downhole tool, the fins generally have a radial length (or height) that causes a snug fit between the downhole tool and the bore. However, manufacturing variances in the fin and in the bore can often prevent a snug fit between the downhole tool and the bore, and too often lead to too loose or tight of a fit.

SUMMARY

The present disclosure generally relates to systems and methods for trimming a fin of a downhole tool. The systems and method provide precise trimming of fins to allow the fins, and thereby the downhole tool, to fit snug in bored pipes of any size. The systems and methods also provide for the use of one or more shims to precisely tailor the height of the fin, facilitating a precise trim of the fin using a saw.

Embodiments also provide a system for trimming a fin on a downhole tool. The fin may radially protrude from a shaft of the downhole tool relative to the axis of the system. The system may comprise a jig that is configured to be mounted to an exterior of the shaft and align coaxially with the tool. The jig may comprise a top, a bottom having bottom edges, and the bottom may be radially spaced apart from the top relative to the axis. The jig may also comprise a front that is axially spaced apart from a rear of the jig. A linear aperture may be formed in the jig and can extend in an axial direction between the top and the bottom. The aperture may have a closed end, an open end, and be sized to axially receive a single fin of the downhole tool. A channel that is arcuate may be located on an underside of the jig beneath the aperture. The channel may extend between the bottom edges and is configured to coaxially align with the tool. The channel may comprise an inner radius of curvature that is substantially similar to an outer radius of curvature of the shaft, such that the channel is configured to form a friction lock on the exterior of the shaft and to be removably attached to the shaft without fasteners. The channel may also span a selected arcuate span relative to the axis. For example, the arcuate span can be less than 180 degrees to less than 240 degrees.

Other embodiments can include a method for trimming fins that extend radially from a shaft of a downhole tool. The method may comprise: (a) removably mounting a jig to an outer surface of the shaft of the downhole tool such that the jig straddles a first one of the fins; (b) adjusting a cutting height of the jig relative to a top of the first one of the fins to a selected height; (c) cutting the first one of the fins to the selected height; (d) removing the jig from the shaft; (e) rotating the shaft to locate another one of the fins in a desired position; and (f) repeating steps (a) through (e) for each remaining fin.

BRIEF DESCRIPTION OF THE DRAWINGS

For a detailed description of example embodiments, reference will now be made to the accompanying drawings in which:

FIG. 8 is an exploded side view of an embodiment of the jig assembly with shims of different thicknesses.

FIG. 9 is a flow chart of an embodiment of a method for trimming a fin.

Definitions

Figure 1:
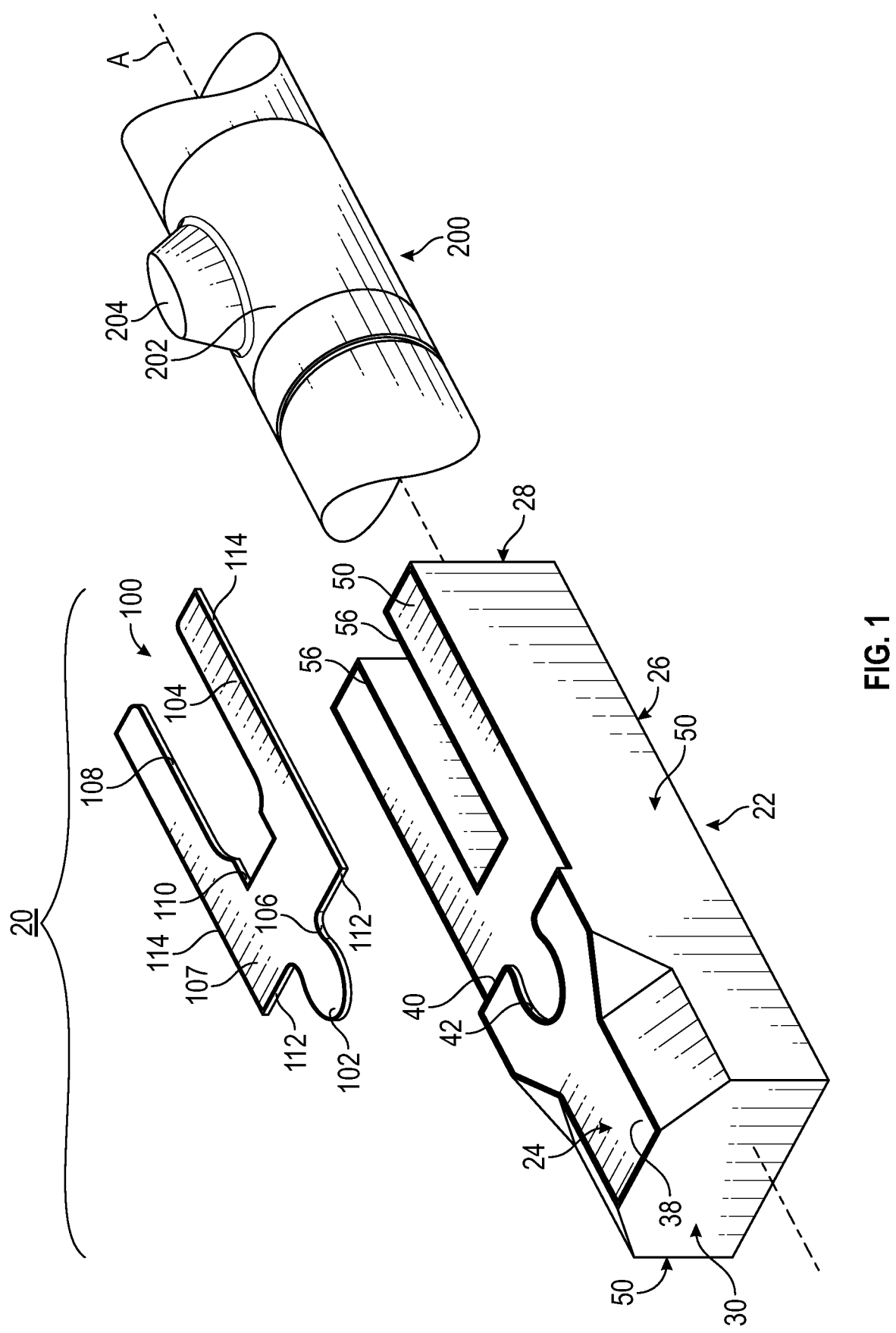
FIG. 1 is a rear perspective view of a downhole tool and an embodiment of a system for trimming a fin of the downhole tool.

Various terms are used to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the axis of the system, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first panel could be termed a second panel, and, similarly, a panel tube could be termed a first panel, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. Like numerals generally indicate like elements throughout the drawings.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 depicts an embodiment of a system 20, for trimming one or more fins 204 on a downhole tool 200. The downhole tool 200 can include, for example, any downhole tool used in oil and gas, mining, HDD, short radius type drilling, etc. In some versions, the downhole tool 200 comprises a centralizer. The downhole tool 200 has a central axis A, a shaft 202 and fins 204 that radially protrude from the shaft 202. The downhole tool 200 may have one, two, three, four, or more fins 204. The fins 204 may be arranged symmetrically or asymmetrically relative to each other. The fins 204 also may be axially spaced apart from each other along a length of the downhole tool 200, where the length extends a distance parallel with the axis A. The system 20 is illustrated as being coaxially aligned with the axis A, and is generally coaxially aligned with the axis A when it is positioned for trimming a fin 204. In some embodiments, the system 20 may have an axis A' (FIG. 2), where the axis A' may be collinear with axis A when the system 20 is positioned for trimming a fin 204.

Figure 2:
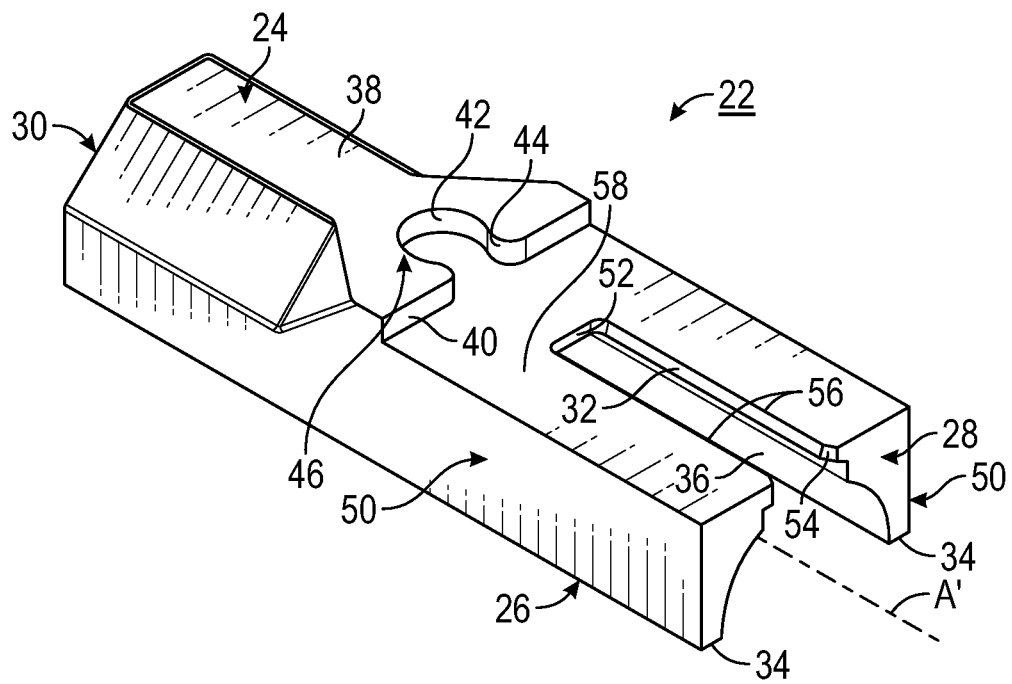
FIG. 2 is a front perspective view of an embodiment of a jig for the system.
Figure 3:
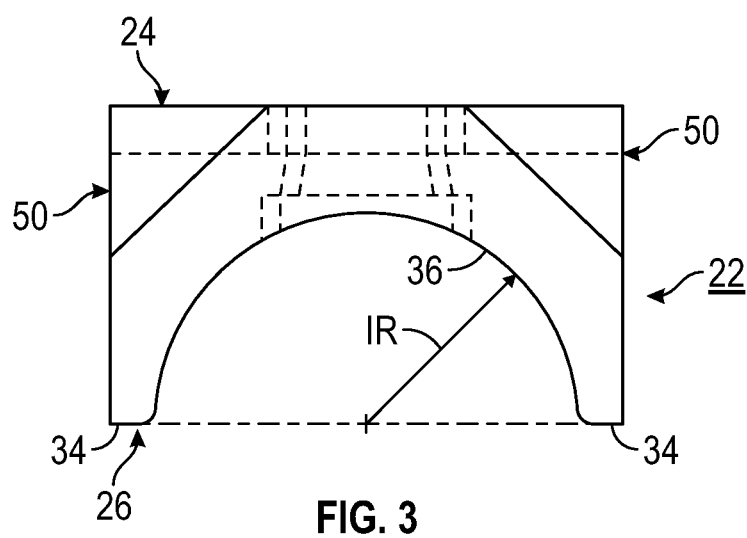
FIG. 3 is a rear view of an embodiment of the jig.

As shown in FIGS. 1-3, the system 20 comprises a jig 22 that is configured to mount to an exterior of the shaft 202 and to coaxially align with the axis A. The jig 22 comprises a top 24, a bottom 26, a front 28, and a rear 30. The bottom 26 has bottom edges 34 and is radially spaced apart from the top 24. The rear 30 is axially spaced apart from the front 28. The jig 22 comprises opposing sides 50. One example of a first distance between the opposing sides 50 defines a jig width that is about 3.25 inches. The jig width may be greater than or less than 3.25 inches. In another example, a second distance between the front 28 and the rear 30 defines a jig length that is about 10 inches. The jig length may be greater than or less than 10 inches. One version has a third distance between the top and a bottom edge 34 that is defined as a jig height of about 1.9 inches. The jig height may be greater than or less than 1.9 inches. It should be appreciated that the specific dimensions referenced herein correspond to the specific dimensions of the downhole tool 200. For example, the specific dimensions provided are based on a shaft 202 having a diameter of about 2.65 inches. Changes can be readily made to accommodate larger or smaller diameters.

The system 20 comprises an aperture 32 that is formed in the jig 22. The aperture 32 can extend linearly in an axial direction between the top 24 and the bottom 26. In the embodiment illustrated, the aperture 32 has a rectangular shape with a closed end 52 and an open end 54. The aperture 32 is sized to axially receive the arcuate width of one fin 204. The jig 22 may also define a pair of opposing aperture edges 56, which can define an aperture width of about 0.8 inches, in one example. The aperture width may be less than or greater than 0.8 inches. It should be appreciated that the aperture width dimension referenced herein corresponds to the specific dimensions of the fin 204. For example, the specific dimension of 0.8 inches for the aperture width corresponds to an arcuate width of 0.8 inches or less for the fin 204.

Figure 4:
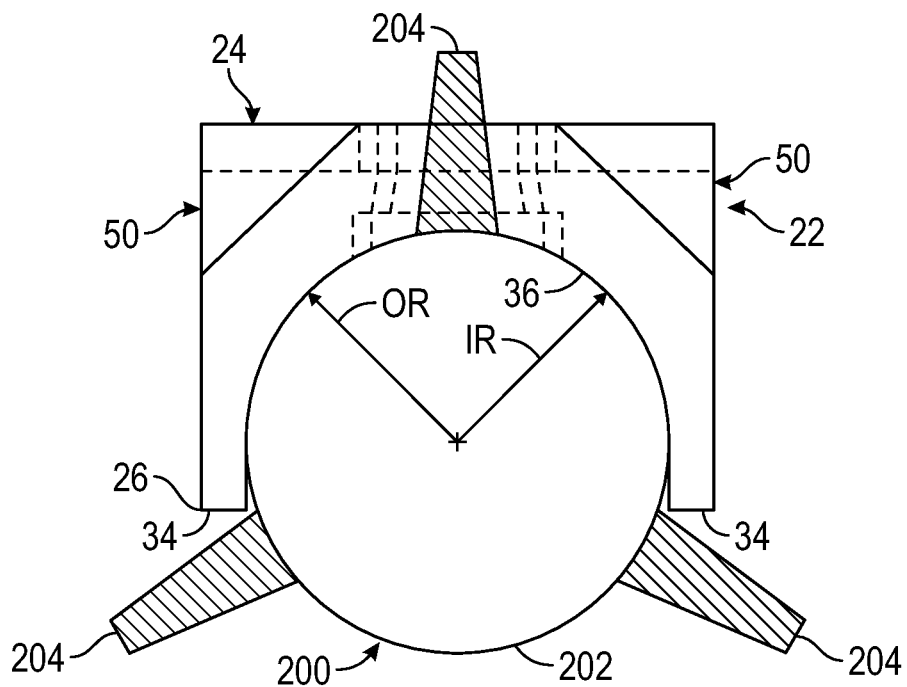
FIG. 4 is a rear view of an embodiment of the jig coupled to a 3-fin version of the downhole tool.

The system 20 may further comprise a channel 36 that is arcuate and located on an underside of the jig 22 beneath the aperture 32. The channel 36 extends between the bottom edges 34 and is coaxially aligned with the axis A. The channel 36 comprises an inner radius of curvature IR (FIG. 3) that is substantially similar to an outer radius of curvature OR (FIGS. 4 and 5) of the shaft 202. Versions of the channel 36 can be configured to form a friction lock on the exterior of the shaft 202, such that is can be removably secured to the shaft 202 without fasteners. The IR and OR may be substantially equivalent. For example, the IR and OR may be equal to each other, or the OR may be slightly less than the IR. In some embodiments, the IR can be about 1.3 inches. It should be appreciated that the IR could be greater or less than 1.3 inches.

Figure 5:
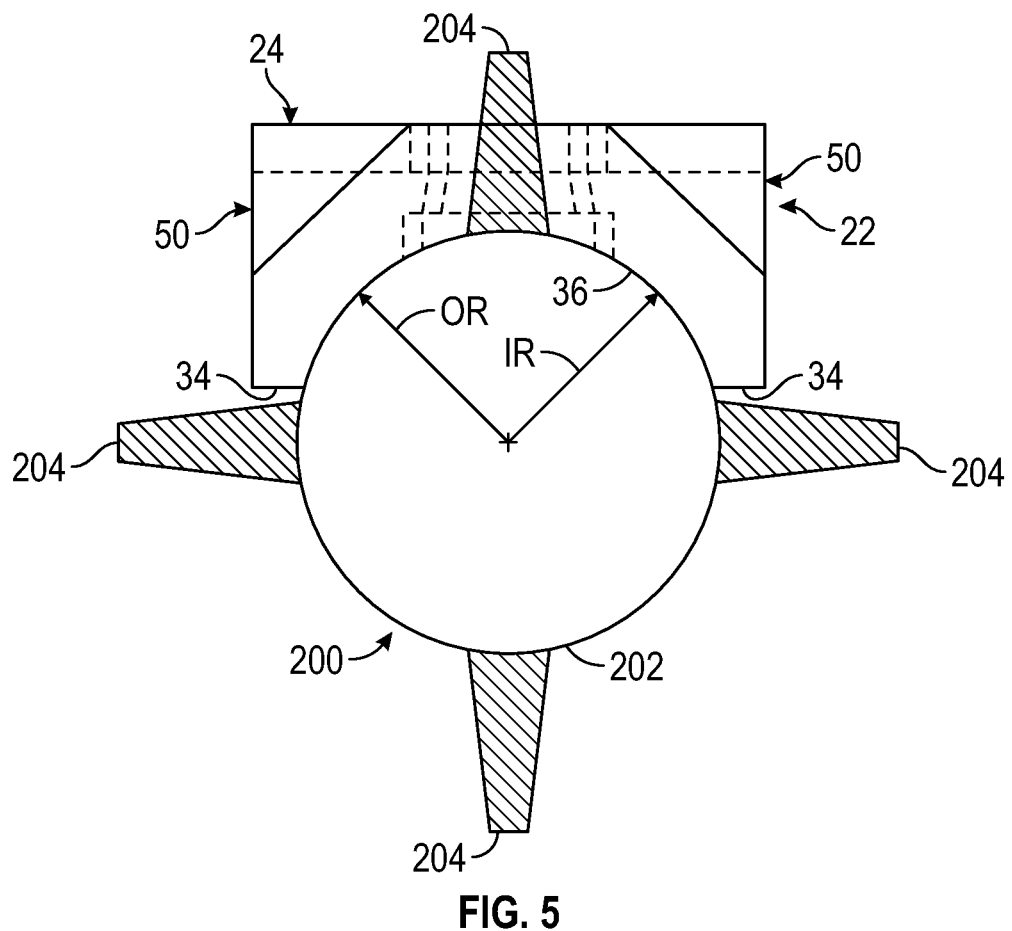
FIG. 5 is a rear view of an embodiment of the jig coupled to a 4-fin version of the downhole tool.
Figure 6:
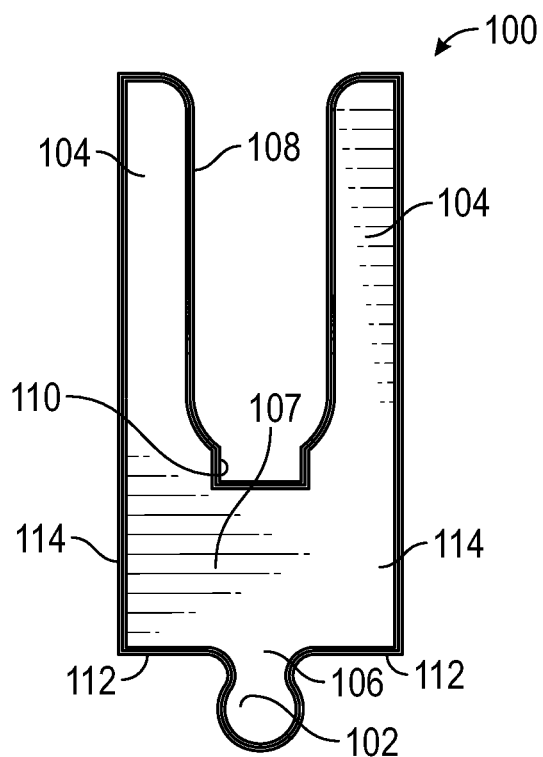
FIG. 6 is a plan view of an embodiment of a shim for the system.

The channel 36 can span an arcuate span relative to the axis A. Examples of the arcuate span can comprise less than 180 degrees or less than 240 degrees. The span of the arcuate span may depend on the number of fins 204 on the shaft 202. For example, in FIG. 4 the shaft 202 has three fins 204 and the arcuate span can be less than 240 degrees so that the jig can fit around the fins 204 that are not being trimmed. Other examples of the arcuate span can be less than 230 degrees or even less than 220 degrees, depending on the width of the fins 204. In the example of FIG. 5, the shaft 202 has four fins 204 and the arcuate span can be less than 180 degrees, less than 170 degrees, or even less than 160 degrees in some versions.

Figure 7:
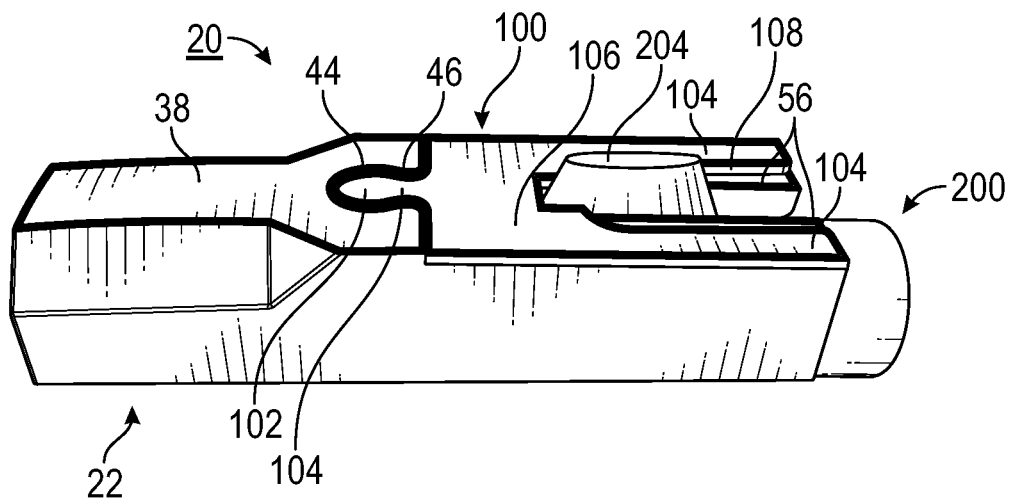
FIG. 7 is a side perspective view of an embodiment of the jig assembly.
Figure 10:
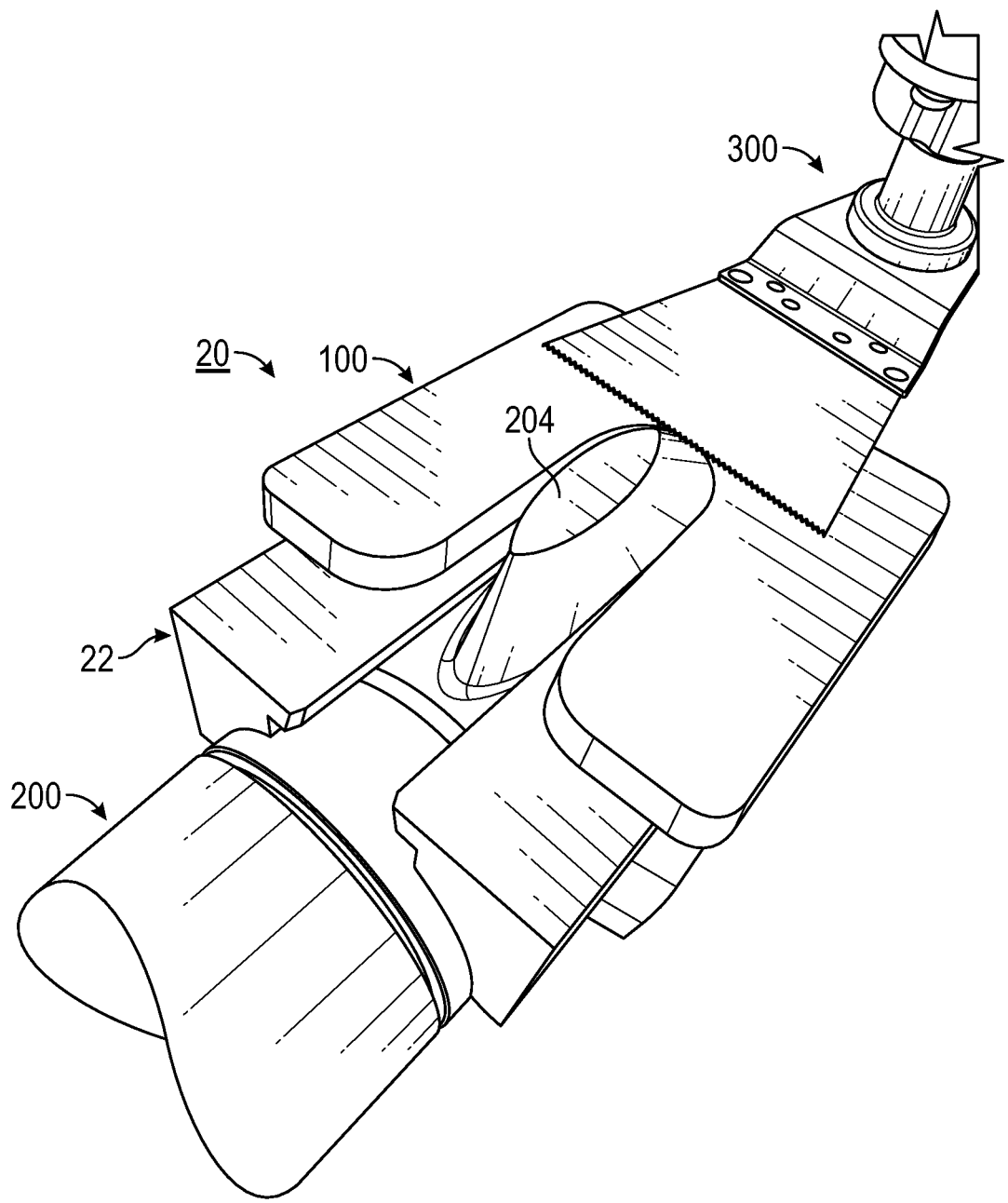
FIGS. 10-13 are front perspective views of an embodiment of the system in operation with a saw being guided by the system to trim a fin.
Figure 11:
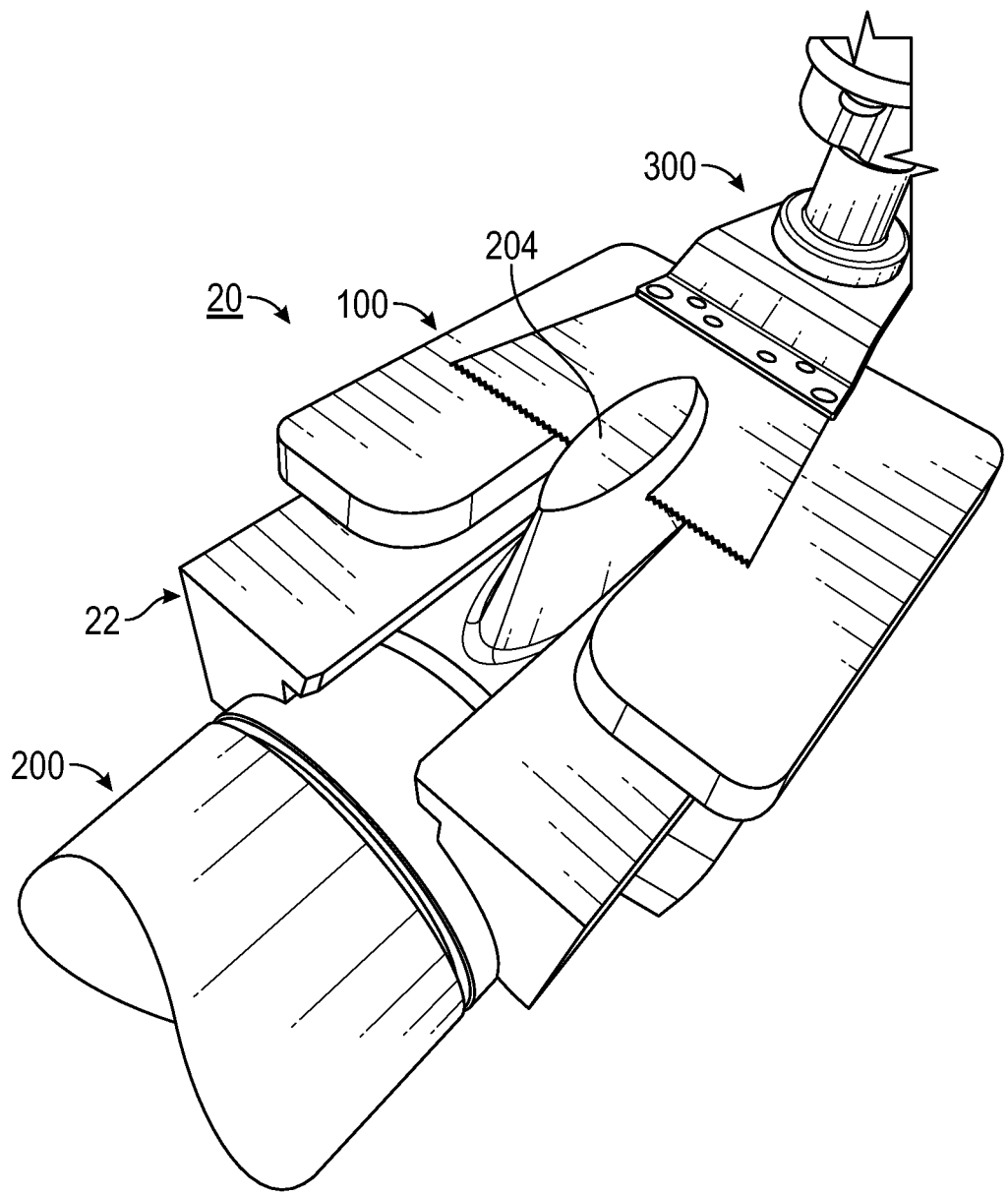
Figure 12:
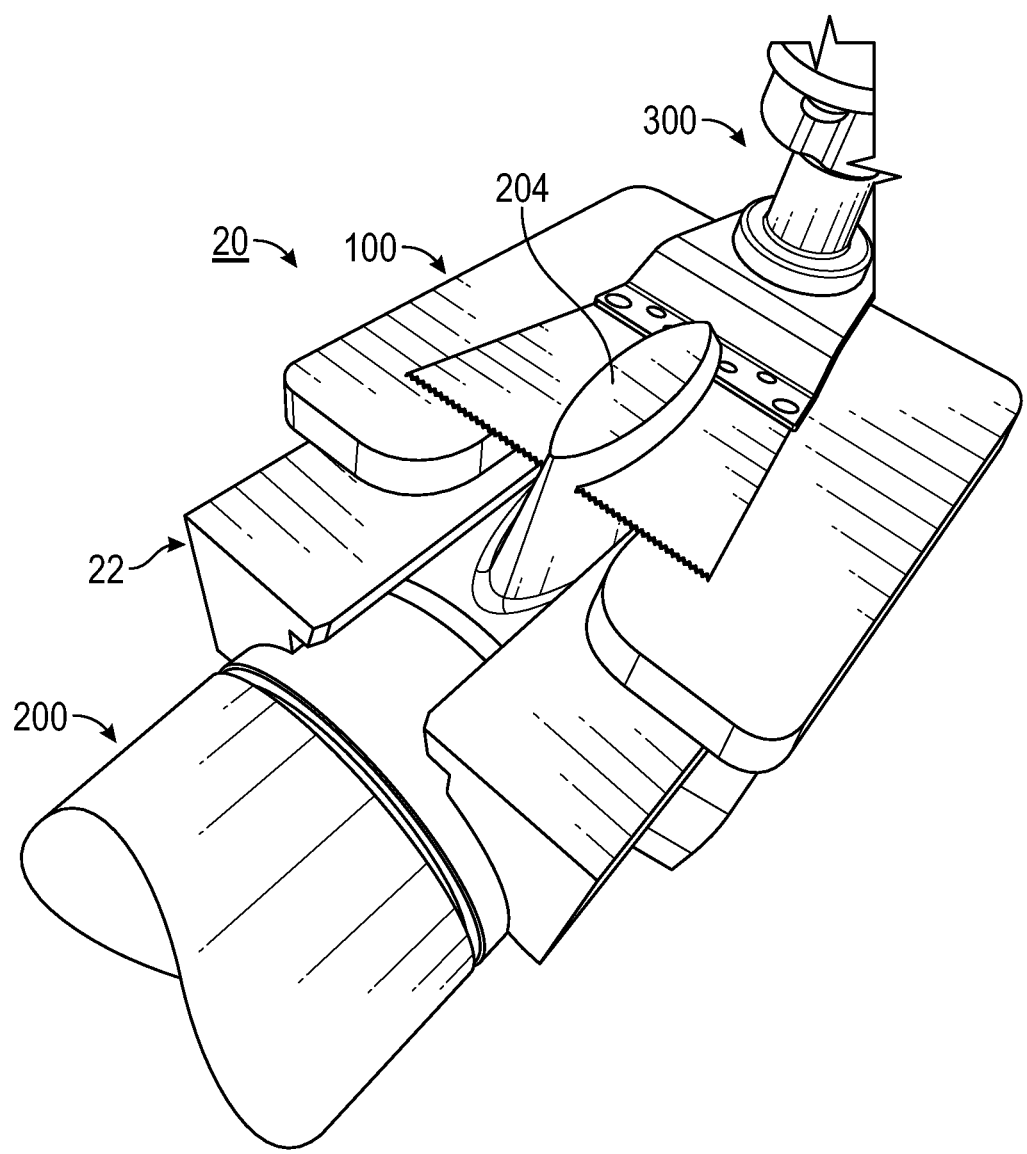
Figure 13:
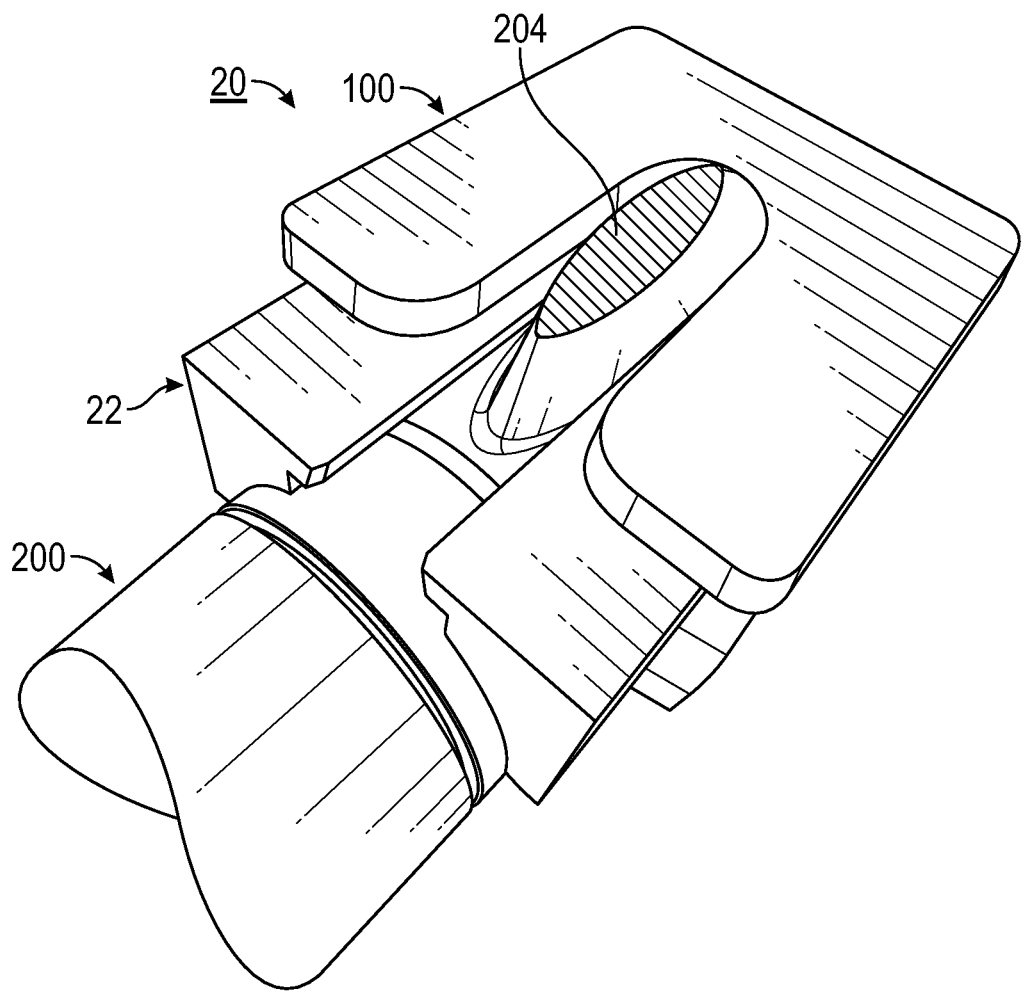

As shown in FIGS. 1, 2, and 7, the top 24 of the jig 22 comprises a handle 38 that extends from the rear 30. A key recess 46 may be formed in the handle 38. The illustrated version of the key recess 46 is generally circular in shape although it can be other shapes, such as square, oval, rectangular, etc. The jig 22 comprises a platform 58 that is located opposite the channel 36, and the platform 58 is coplanar with a bottom of the key recess 46. The platform 58 is disposed about the aperture 32 and abuts the aperture edges 56. The handle 38 further comprises a shoulder wall 40 that is perpendicular to the platform 58. The key recess 46 comprises a head wall 42 that defines a portion of the perimeter of the key recess 46. The key recess 46 also comprises a neck wall 44 that defines another portion of the perimeter of the key recess 46.

With reference to FIGS. 1 and 6-8, the system 20 comprises one or more shims 100.

Portions of the shims 100 are configured to be positioned in the key recess 46 and on the platform 58. The key recess 46 receives the shims 100 to prevent excessive movement of the shims 100 during operation. In one example, each shim 100 comprises a head 102 and a neck 106 that extends from the head 102. The shim 100 also has a body 107 extending from the neck 106, and legs 104 extend from the body 107 opposite the neck 106. A fin slot 108 extends between the legs 104. The fin slot 108 comprises a lock portion 110 that extends into the body 107. The body 107 also has shoulders 112 that extend from the neck 106 toward opposing outer edges 114 of the body 107.

As illustrated in FIG. 7, the shim 100 can be positioned in the key recess 46 and on the platform 58. The shoulder wall 40 can abut the shoulders 112 of the shim 100. In addition, the head wall 42 of key recess 46 can receive and align with the head 102. The neck wall 44 can receive and align with the neck 106. This serves to align and secure the shim 100 to the jig 22 to prevent excessive movement of the shim 100 during operation.

In some embodiments, the system 20 may comprise of more than one shim 100. When more than one shim 100 is present in the system 20, the shims 100 may comprise different thicknesses. For example, each shim 100 can have a defined thickness that differs from every other shim 100. Alternatively, some the shims 100 may comprise a same thickness. When using more than one shim 100, the shims 100 can be selectively accumulated in the key recess 46 and on platform 58 to precisely adjust a fin cutting height of the system 20. A shim 100 having the greatest thickness may comprise a base plate and be positioned on top of the lower shims 100, or directly on the platform 58, to define a cutting plane for the fin 204. The base plate may be formed from a same material as the other shims 100, or from a different material that is harder than the other shims.

The present disclosure further provides a method for trimming the fins 204 of a downhole tool 200. Embodiments of the method (see, e.g., FIG. 9) can comprise: (a) removably mounting a jig 22 to an outer surface of the shaft 202 of the downhole tool 200 such that the jig 22 straddles a first fin 204a; (b) adjusting a cutting height of the jig 22 relative to a top of the first fin 204a to a selected height; (c) cutting the first fin 204a to the selected height; (d) removing the jig from the shaft; (e) rotating the shaft to locate a second fin 204b in a desired position; and (f) repeating steps (a) through (e) for the second fin 204b and each remaining fin.

Before step (a), the method may further comprise placing the downhole tool 200 on supports to elevate the downhole tool 200 above an underlying support surface. The step (a) may comprise securing the jig 22 to the shaft 202 without fasteners. It also may comprise securing the jig 11 to the shaft 202 by a friction fit. For example, the inner radius of curvature IR of the channel 36 may form a friction fit with the outer radius of curvature OR of the shaft 202. In some embodiments, the friction fit may be formed by tamping or hammering the jig 22 to the shaft 202 with a rubber mallet, for example. The friction fit may secure the jig 22 to the shaft 202 such that the step (d) may comprise tamping or hammering the jig 22 off of the shaft 202 with a rubber mallet, for example.

The step (b) may comprise adjusting the cutting height with one or more shims 100. For example, the cutting height may be adjusted by placing portions of one or more shims 100 in the key recess 46 and on the platform 58. The shims 100 may be positioned such that the legs 104 surround one of the fins 204. With the cutting height set, the system 20 may be used in conjunction with a saw 300 (FIGS. 10-13) to cut the fin 204. For example, the saw 300 may be positioned to abut the body 107 of the uppermost shim 100 and may be moved from the body 107 along the legs 104. As the saw 300 moves towards the legs 104 an oscillating blade 302 is guided by and slides along the body 107 and legs 104 to engage and trim a portion of the radial dimension of the fin 204 that extends above the shim 100.

In some versions, the final height of the fin 204 after trimming is determined by the thicknesses of the shims 100 positioned in the key recess 46. For example, the height of the fin 204 may be adjusted by determining the combined thickness of one or more of the shims 100 to specify the final height of the fin 204. The shims 100 can be interchangeably combined to specify almost any final height since they can have different thicknesses. The precise trimming of the fins 204 enable the downhole tool 200 to fit properly in bored pipes of any diameter.

This discussion is meant to be illustrative of the principles of the various embodiments. Numerous variations and modifications will be apparent to those skilled in the art once the above disclosure is fully appreciated. It is intended that the following claims be interpreted to embrace all such variations and modifications.

What is claimed is:

1. A system for trimming a fin on a downhole tool, the downhole tool having an axis, the fin radially protrudes from a shaft (202) of the downhole tool relative to the axis (A), the system (20) comprising:
   a jig (22) configured to be mounted to an exterior of the shaft, the jig (22) comprises a top (24), a bottom (26) having bottom edges (34), the bottom is radially spaced apart from the top (24) relative to the axis (A), and the jig comprises a front (28) and a rear (30) that is axially spaced apart from the front (28);
   an aperture (32) that is linear and formed in the jig (22), the aperture (32) extends in an axial direction between the top (24) and the bottom (26), and the aperture (32) has a closed end (52), an open end (54), and is sized to axially receive the fin (204) of the downhole tool (200) such that a portion of the fin extends radially beyond the top (24);
   a channel (36) that is semi-cylindrical and located on an underside of the jig beneath the aperture (32), the channel extends between the bottom edges (34), and the channel is configured to be removably attached to the shaft; and
   the channel (36) comprises an arcuate span relative to the axis (A);
   the aperture and the channel are directly connected together.

2. The system (20) of claim 1, wherein the top (24) comprises a handle (38), a key recess (46) formed in the handle (38), the jig (22) comprises a platform (58) located opposite the channel (36), and the platform (58) is coplanar with a bottom of the key recess (46).

3. The system (20) of claim 2, further comprising a shim (100) configured to be positioned in the key recess (46) and on the platform (58) to adjust a fin cutting height of the system relative to the portion of the fin that extends radially beyond the top (24).

4. The system (20) of claim 3, wherein the shim (100) comprises a head (102), a neck (106) extending from the head (102), a body (107) connected to the neck (106), legs (104) extending from the body (107) opposite the neck (106), and a fin slot (108) extending between the legs (104).

5. The system (20) of claim 4, wherein the fin slot (108) comprises a lock portion (110) that extends into the body (107).

6. The system (20) of claim 4, wherein the body (107) has shoulders (112) that extend from the neck (106) toward opposing outer edges (114) of the body (107).

7. The system (20) of claim 6, wherein:
the handle (38) comprises a shoulder wall (40) configured to abut the shoulders (112); and
the key recess (46) comprises a head wall (42) configured to receive the head (102), and a neck wall (44) configured to receive the neck (106) to secure the shim (100) to the jig (22).

8. The system (20) of claim 1, wherein an inner radius of curvature (IR) of the channel (36) is equal to or greater than the outer radius of curvature (OR) of the shaft.

9. The system (20) of claim 1, wherein the aperture (32) is rectangular in shape.

10. The system (20) of claim 3, wherein the shim (100) comprises a plurality of shims (100) that can be selectively combined and stacked together to adjust the fin cutting height of the system relative to the portion of the fin that extends radially beyond the top (24).

11. The system (20) of claim 10, wherein some of the shims (100) comprise different thicknesses.

12. The system (20) of claim 10, wherein some of the shims (100) comprise a same thickness.

13. The system (20) of claim 11, wherein one of the shims (100) comprises a base plate having a greater thickness than any other shim, at least one shim is configured to be placed on the platform (58) and in the key recess (46), and the base plate is configured to be placed on top the at least one shim (100) such that a top surface of the base plate defines a fin cutting plane of the system.

14. The system (20) of claim 1, wherein the arcuate span comprises less than 240 degrees.

15. The system (20) of claim 1, wherein the jig is configured to be substantially coaxial with the downhole tool.

16. The system (20) of claim 1, wherein the channel comprises an inner radius of curvature (IR) that is configured to form a friction lock on the exterior of the shaft.

17. The system of claim 1, wherein the channel is configured to be removably attached to the shaft without fasteners.

* * * * *